No. 785,321. PATENTED MAR. 21, 1905.
R. L. McLAUGHLIN.
PROCESS OF MANUFACTURING ARTIFICIAL AIGRETS.
APPLICATION FILED SEPT. 23, 1904.
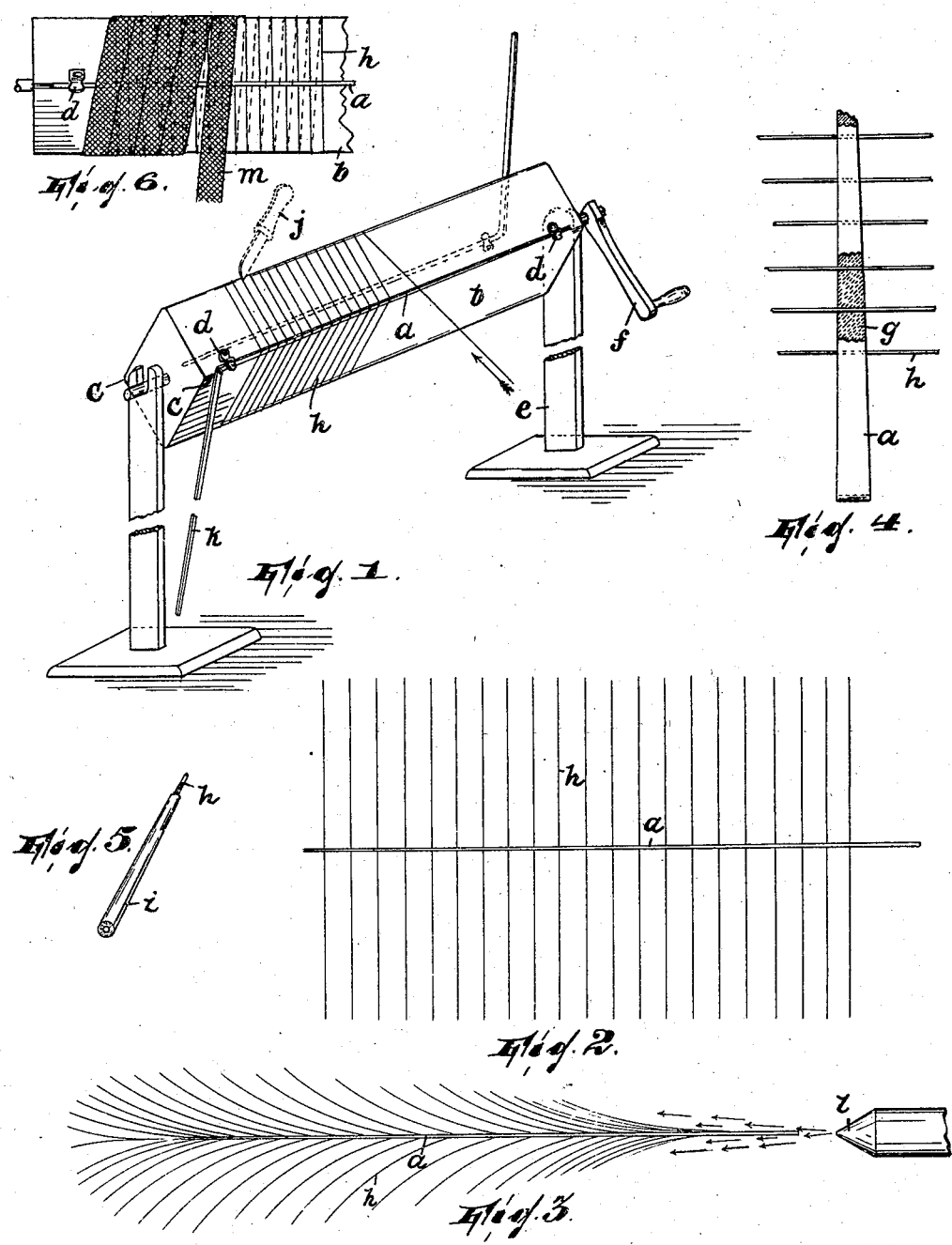

No. 785,321.                                                        Patented March 21, 1905.

UNITED STATES PATENT OFFICE.

ROBERT L. McLAUGHLIN, OF LAKEVIEW, NEW JERSEY, ASSIGNOR TO THE AIGRETTE SUPPLY COMPANY, OF PATERSON, NEW JERSEY, A CORPORATION OF NEW JERSEY.

PROCESS OF MANUFACTURING ARTIFICIAL AIGRETS.

SPECIFICATION forming part of Letters Patent No. 785,321, dated March 21, 1905.

Application filed September 23, 1904. Serial No. 225,607.

*To all whom it may concern:*

Be it known that I, ROBERT L. McLAUGHLIN, a citizen of the United States, residing in Lakeview, in the county of Passaic and State of New Jersey, have invented certain new and useful Improvements in Processes of Manufacturing Artificial Aigrets; and I do hereby declare the following to be a full, clear, and exact description of the invention, such as will enable others skilled in the art to which it appertains to make and use the same, reference being had to the accompanying drawings, and to letters of reference marked thereon, which form a part of this specification.
My present invention has for its object the manufacture of artificial aigrets or other similar articles. The article which is the product of my process forms the subject of an application for Letters Patent of the United States filed of even date herewith.

In carrying out my process of manufacturing an imitation of the ordinary aigret certain filaments which are to form the barbs thereof are first secured to and along the stem or shaft thereof at suitable intervals in such manner that the point of attaching each to the stem comes at the middle of the filament, thus leaving about the same length or one-half of the filament on both sides of the shaft.
Then by suitable means the halves of the filaments are caused to be permanently bent so that each half is convergent relatively to the stem and also to its complement, all those on each side of the stem being approximately parallel, all in imitation of the genuine aigret.

Broadly, my process of manufacturing an imitation of the ordinary aigret consists in the foregoing. I have in practice, however, found it advantageous, principally in point of economy of material, labor, and time, to introduce certain features not specifically mentioned in the foregoing. These I will set forth in reference to the conduct of my process as now practiced by me and now to be described and then point them out in the claims.

In the accompanying drawings, Figure 1 shows a drum having gummed stiffened attenuated pieces which are to form the aigret shafts or stems held thereon at angular portions thereof by a winding of sized silk passing around about one half of each of said pieces and leaving the other half temporarily free and also how a certain cutting of the silk is effected. Fig. 2 shows one of the aigrets after removal from the drum and after the free part of its stem has been laid on and made to adhere to that to which the silk filaments formed as in Fig. 1 have become attached by the gum thereof. Fig. 3 shows how the filaments are deflected by a suitable fluid-jet. Fig. 4 is a magnified fragmentary view of the aigret as shown in Fig. 2, a portion of the top layer of the shaft being broken away to show the gum. Fig. 5 is a magnified view in perspective of a fragment of one of the sized filaments, and Fig. 6 illustrates one way of securing the proper binding together of the parts of the aigret.

I first cut thin celluloid into long narrow strips $a$. These are then applied to the drum $b$ so that one-half of each lies along one of the opposite angular portions $c$ of said drum, which is of polygonal shape, and there held by a suitable fastening means, such as clips $d$. Said drum is journaled in a frame $e$ and may be rotated by a crank $f$. Before being placed on the drum the strips are gummed on one side from end to end, as at $g$ in Fig. 4, and these gummed sides are out when the strips are secured to the drum. I then take a silk, cotton, or other suitable thread $h$, coated with a preferably waterproof material $i$, and wind it on the drum in spiral uniformly-spaced coils from end to end of the drum. On account of the strip $a$ being laid on the angular portions $c$ of the drum the thread has a good adhering contact with the portion of the strip $a$ over which it is wound. A knife $j$ is then drawn across the spirals of thread, longitudinally of the drum and on both sides thereof, midway between the two strips. The strips, with the severed threads or filaments attached, can now be removed from the drum, whereupon the free portion $k$ of each strip is laid on that to which the filaments are adhering and made itself to adhere thereto from end to end. This step of securing together the two portions of the strip may, if desired, come earlier in the operation, as immediately before or after the cutting of the thread. The aigret is now complete, with the exception of shaping the filaments. $l$ in Fig. 3 designates a fluid-jet. The aigret is next presented endwise to this jet and there held until the filaments have been bent thereby at or adjacent the stem in such manner that the two halves of each stand convergent to each other and to the stem, as best illustrated in Fig. 3.

In practice I prefer that the jet used be a steam-jet, for then the permanency of the bending back of the filaments will be insured by the sizing being first caused by the machine to slightly soften, and then, after removal from the jet, to harden or set, and thus retain the filaments in the deflected position.

If the two portions of each strip are made to adhere to each other before their removal from the drum, this can be done conveniently and in such a manner as to keep the parts accurately disposed until the adhesive sets by first laying the free portion of each strip on its complement after the winding of the thread is finished and then winding a binding-strip of tape $m$ around the whole, as in Fig. 6. When the adhesive thoroughly sets, the tape can be removed.

Having thus fully described my invention, what I claim as new, and desire to secure by Letters Patent, is—

1. The process of manufacturing artificial aigrets which consists in attaching a series of filaments, each in its middle portion, to an attenuated strip at approximately uniform intervals along the latter, and then substantially simultaneously bending the free or projecting portions of said filaments into permanent convergence those on one side of said strip with those on the other, substantially as described.

2. The process of manufacturing artificial aigrets which consists in attaching a series of filaments, each in its middle portion, to an attenuated strip at approximately uniform intervals along the latter, and then presenting said strip, with said filaments attached, endwise to the action of a fluid-jet, whereby to substantially simultaneously bend the free or projecting portions of said filaments into permanent convergence those on one side of said strip with those on the other, substantially as described.

3. The process of manufacturing artificial aigrets which consists in laying an attenuated strip longitudinally on a suitable mandrel, winding a thread around the mandrel and the strip in substantially uniform coils and attaching the thread to the strip where it intersects the latter, then cutting the coils in a direction substantially parallel with said strip, and then substantially simultaneously bending the free or projecting portions of the filaments formed by cutting the coils into permanent convergence those on one side of said strip with those on the other, substantially as described.

4. The process of manufacturing artificial aigrets which consists in laying an attenuated strip longitudinally on a suitable mandrel, winding a thread around the mandrel and the strip in substantially uniform coils and attaching the thread to the strip where it intersects the latter, then cutting the coils in a direction substantially parallel with said strip, and then presenting said strip, with the filaments formed by cutting the coils attached thereto, endwise to the action of a fluid-jet whereby to simultaneously bend the free or projecting portions of said filaments into permanent convergence those on one side of said strip with those on the other, substantially as described.

5. The process of manufacturing artificial aigrets which consists in attaching a series of filaments to an attenuated strip at approximately uniform intervals along the latter and then substantially simultaneously bending the free or projecting portions of said filaments into permanent convergence with said strip, substantially as described.

6. The process of manufacturing artificial aigrets which consists in attaching a series of filaments to an attenuated strip at approximately uniform intervals along the latter, and then presenting said strip, with said filaments attached, endwise to the action of a fluid-jet, whereby to substantially simultaneously bend the free or projecting portions of said filaments into permanent convergence with said strip, substantially as described.

7. The process of manufacturing artificial aigrets which consists in laying an attenuated strip longitudinally on a suitable mandrel, winding a thread around the mandrel and the strip in substantially uniform coils and attaching the thread to the strip where it intersects the latter, then cutting the coils in a direction substantially parallel with said strip, and then substantially simultaneously bending the free or projecting portions of the filaments formed by cutting the coils into permanent convergence with said strip, substantially as described.

8. The process of manufacturing artificial aigrets which consists in laying an attenuated strip longitudinally on a suitable mandrel, winding a thread around the mandrel and the strip in substantially uniform coils and employing an adhesive to secure said coils to the strip where they traverse the latter, then winding a flexible strip around the winding of thread and maintaining it so until the adhesive sets, and then cutting the winding of thread substantially parallel with the first-named strip, substantially as described.

9. The process of manufacturing artificial aigrets which consists in winding a thread around a mandrel in substantially uniform coils, attaching said coils and an attenuated strip laid transversely of said coils together, and then cutting the coils parallel with the strip, substantially as described.

10. The process of manufacturing artificial aigrets which consists in winding a thread around a mandrel in substantially uniform coils, attaching said coils and an attenuated strip laid transversely of said coils together, then cutting the coils parallel with the strip, and then bending the portions of said thread on one side of said strip into permanent convergence with those on the other, substantially as described.

In testimony that I claim the foregoing I have hereunto set my hand this 14th day of September, 1904.

ROBERT L. McLAUGHLIN.

Witnesses:
JOHN W. STEWARD,
ALFRED GARTNER.